United States Patent Office 2,867,597
Patented Jan. 6, 1959

2,867,597

METHODS OF FLAMEPROOFING FIBERS, COMPOSITIONS USED THEREIN

James R. Costello, Jr., Chicago Heights, and Thornton P. Traise, South Chicago Heights, Ill., assignors to Victor Chemical Works, a corporation of Illinois No Drawing. Application September 22, 1953
Serial No. 381,763

4 Claims. (Cl. 260—29.6)

This invention relates to the method of preparing a flameproofing emulsion, the use of said emulsion in flameproofing cellulosic fibers, and flameproof cellulosic fibers.

The process of this invention results in a flameproofed fabric which will withstand washing without substantially affecting its flame-resistant character or changing its other physical qualities.

The process of this invention involves applying a partially polymerized dialkenyl beta, carboxyalkyl alkanephosphonate to the surface of a cellulosic fabric and further polymerizing the ester in contact with the fabric to effect attachment of the resulting polymer to the fibers thereof.

Suitable starting compounds for use in the new process are those described and claimed in the A. D. F. Toy and R. S. Cooper U. S. Patent application Serial No. 381,764, filed September 22, 1953. The compounds are dialkenyl beta, carboxyalkyl alkanephosphonates having the formula

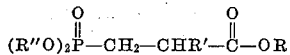

wherein R″ is selected from the group consisting of allyl and methallyl groups, R′ is a hydrogen atom or methyl group, and R represents a methyl or ethyl radical.

As described in the above application, the ester compounds may be produced by reacting diallyl or dimethallyl phosphites with an ester selected from the group consisting of methyl and ethyl methacrylates and methyl and ethyl acrylates, in the presence of a sodium alkenolate under suitable reaction conditions. These ester compounds may be employed in the flameproofing process without further purification, though it is preferred to employ the distilled ester.

In the flameproofing procedure, the dialkenyl B-carboxyalkyl alkanephosphonate is dissolved in a solvent such as "Chlorex" (B,B′ dichloroethyl ether), and a peroxide polymerization catalyst such as benzoyl peroxide added. The mixture is heated until the viscosity of the solution has increased to about 2 to 4 times its original value indicating the formation of a partial polymer. Complete polymerization to a solid resin is to be avoided at this stage. The solution is then cooled and the partial polymer separated by adding a selective solvent for the monomeric ester in which the partial polymer is substantially insoluble. The separated partial polymer may be in the form of a hard solid or gummy mass depending on the amount of occluded monomer and the particular solvent employed. It is preferred that the partial polymer be substantially free from monomeric ester for optimum flameproofing effect though satisfactory results may be obtained by the use of the crude, gummy partial polymer in the impregnating solution. The partial polymer is then dissolved in a suitable solvent to form the fabric impregnating bath. Preferably, the partial polymer is dissolved in a mixture of 30 parts methanol or ethanol and 70 parts ethylene dichloride, by volume, to give a concentration of the partial polymer of about 20–50%. The fabric to be treated is immersed in this solution for a few minutes to allow good penetration, after which the fabric is wrung out, dried at about 100° C. and cured. The resulting fabric has good flame-resistant qualities.

The flameproofing character of the treated fabric is tested according to the method described as the vertical flame resistance test in the supplement to Federal Specifications Test Method CCC–T–191a or b (Method No. 5902). In this method a 2½ inch by 10 inch strip of the cloth is suspended vertically and ignited at the bottom with a Bunsen burner. Flame resistance is measured by the burning time, the char length of the burn, and the amount of afterglow. The fabric is considered to have satisfactory flame-resistance if the burning time is less than 12 seconds, the char length less than about 9 inches, and the afterglow negligible. In addition to the above, the character of the remaining char is an important characteristic. A coherent, porous, and reasonably flexible char is highly desirable because of its insulating quality. Fabrics treated in accordance with the present invention satisfactorily meet the above specifications.

In a typical example of our new process, 50 grams of diallyl beta-carboxymethyl propanephosphonate was dissolved in 50 grams "Chlorex" (B,B′ dichloroethyl ether) in a flask equipped with stirrer, thermometer, nitrogen inlet, and pipette with bulb attached. The temperature was raised to 100° C. with stirring under a nitrogen atmosphere. One and one-tenth grams of benzoyl peroxide was added to catalyze the polymerization which was allowed to proceed until the change in viscosity of the solution was such that the discharge time for a 5 ml. pipette was three to four times that required for the starting solution. At this point, the solution was cooled with an ice bath and the partially polymerized ester separated from the solution by the addition of a large volume of hexane. A gummy solid partial polymer was obtained. A total of 3.8 liters of hexane was used in the precipitation and washing of the partial polymer.

The resulting partial polymer was dissolved in a mixture of 30 parts methanol and 70 parts ethylene dichloride to give a 22.0% concentration of the partial polymer. A standard size strip of cotton muslin cloth was submerged in this solution for 5 minutes, wrung out, dried and cured for 30 minutes in an oven at a temperature of 100–108° C. The add-on or increase in weight of the cloth was 26.1%. Washing for 15 minutes in a 0.5% soap solution resulted in a 10.3% weight loss. The unwashed cloth when tested for flame resistance showed a char length of 4½ inches and a burning time of 12 seconds. Tests after washing gave a char length of 6⅝ inches and a burning time of 12 seconds. The afterglow and physical character of the char were satisfactory.

In a similar test with the final concentration of the treating bath at 26.3%, the add-on was 34%. In this case, the loss on washing was 11.3%. Tests for flame resistance showed for the unwashed cloth a char length of 4¾ inches and a burning time of 10.0 seconds, and for the washed cloth a char length of 6⅛ inches and a burning time of 11 seconds.

Satisfactory flameproofing results may be obtained through the use of an emulsion procedure whereby the ester is partially polymerized in the form of an emulsion and the emulsion used for impregnating the fabric. In a typical emulsion procedure, 58 grams of diallyl beta-carboxymethyl propanephosphonate was placed in a liter flask equipped with stirrer, thermometer, and dropping funnel. While rapidly stirring 92.5 ml. of a 2% solution (aqueous) of polyvinyl alcohol was added producing an emulsion. This emulsion was then buffered with 5 grams of sodium bicarbonate and a solution of 1.74 grams of potassium persulfate in 92.5 ml. of water added after the temperature of the emulsion had been raised to about 76°

C. The persulfate solution was added rapidly until 25 ml. had been added and then dropwise until the remainder had been added while holding the polymerization temperature within the range of about 73°–79° C. for 2½ hours. The emulsion was then cooled to room temperature and used for treating the cloth to be flameproofed.

A piece of army cotton cloth was submerged in the emulsion for 5 minutes then passed through a wringer to remove the excess emulsion, and dried in an oven at 100° C. The dried cloth was then cured for 7–30 minutes at about 140° C. The add-on or increase in weight of the cloth was 24.4%. Washing for 15 minutes with a 0.5% soap solution resulted in a 6.4% weight loss. The treated unwashed cloth when tested for flame resistance showed a char length of 6⅛" and burning time of 10.8 seconds. Tests after washing gave a 6½" char length and a burning time of 10.8 seconds.

The emulsion polymerization procedure and resulting flameproofing emulsion may be modified by the addition of such compounds as bromoform and carbon tetrachloride during the polymerization step. For example, in the addition of a small amount of bromoform it is believed that the unsaturation in the partial polymer is reduced to some extent by an addition reaction. Some improvement in the feel and stiffness of the treated fabric is obtained by the use of such modified emulsions. However, this modified procedure, while satisfactory, is not preferred since the improvement in feel is offset to some extent by a reduction in the permanency of the flameproofing effect.

Other modifications of the flameproofing procedure include the use of wetting and emulsifying agents in the final emulsions to facilitate the wetting and impregnation of the fabric by the flameproofing composition. Such modification of the final treating bath is not critical since most of the commonly available wetting and emulsifying agents are suitable for the purpose. A suitable group of nonionic surface active agents are the reaction products of olefine oxides with lauryl acid ortho- and pyrophosphates.

The following table gives data relating to conditions and the results of several additional polymerization procedures and fabric treatments. The general procedure employed was substantially the same as in the above described procedure except that in two of the examples bromoform was added in the initial polymerization step. In these two cases the treated and washed fabric had a softer feel than the original untreated fabric; however, the washing removed a larger amount of the flameproofing composition and appreciably increased the char length. However, the resulting treated fabric was rated as satisfactory.

| | | | | |
|---|---|---|---|---|
| Diallyl beta-carboxymethyl propanephosphonate (grams) | 232.0 | 58.0 | 58.0 | 232.0 |
| Polyvinyl alcohol (ml. of 2% aqueous soln.) | 370 | 92.5 | 92.5 | 370.0 |
| Catalyst K₂S₂O₈ (grams) | 6.96 | 1.74 | 1.74 | 6.96 |
| Water (ml.) | 370 | 92.5 | 92.5 | 370.0 |
| Buffer (NaHCO₃) (grams) | 20 | 5.0 | 5.0 | 20.0 |
| Bromoform (grams) | 0 | 2.9 | 25.3 | 0 |
| Polyvinyl alcohol (percent by weight based on reactants (i. e., phosphonate plus bromoform)) | 3.2 | 3.1 | 2.2 | 3.2 |
| Polymerization temp. (° C.) | 75–80 | 75–79 | 78–80 | 72–79 |
| Polymerization time (min.) | 150 | 150 | ¹20 | 150 |
| pH of emulsion | 7.8 | 7.5 | 7.5 | 7.9 |
| Add-on (percent) | 28.3 | 24.0 | 31.4 | 23.9 |
| Number of treatments | 2 | 2 | 2 | 2 |
| Cure temp. (° C.) | 140 | 140 | 140 | 140 |
| Cure time (min.) | 14 | 14 | 14 | 14 |
| Loss on washing (percent) | 1.9 | 7.78 | 10.8 | 4.23 |
| Retention on cloth (percent) | 91.3 | 60.0 | 55.5 | 79.1 |
| Unwashed cloth: | | | | |
| Char length (inches) | 5⅜ | 5⅞ | 4¹⁄₁₆ | 5 |
| Burning time (sec.) | 11 | 10 | 7½ | 10 |
| Washed cloth: | | | | |
| Char length (inches) | 4½ | 6¾ | 5⅞ | 5¼ |
| Burning time (sec.) | 10 | 12 | 9 | 11 |

¹ Hours.

We do not fully understand the theory or mechanism of attaching the solution and emulsion polymers to the fibers in producing the permanent flameproofing effect, but believe the fibers are coated with the substantially polymerized phosphonate ester and upon curing, further polymerization of the prepolymer or retained traces of monomeric components firmly attaches the polymer to the fibers. Stiffness in the fabric is probably avoided by the prepolymerization of the ester before treating the fabric in order to limit the amount of polymerization taking place in the curing step, and thereby substantially limiting the cross welding of one fiber to another in the fabric.

The term "add-on" as used in the above examples means the amount of the polymer attached to the fabric and is expressed as percentage gain in weight over the untreated fabric. The "add-on" will vary with the strength of the impregnating solution or emulsion, the manner of removing the excess solution from the fabric, and the number of impregnation treatments. For satisfactory results, the amount of "add-on" is in most cases at least 10%, and preferably from 20%–40%. However, as little as 5% add-on will give an appreciable flameproofing effect.

The procedures in which solutions are used and the solution polymerization are disclosed and claimed in the copending application of A. D. F. Toy and R. S. Cooper, Serial No. 381,760, filed September 22, 1953.

The foregoing detailed description has been given for clearness of understanding only and no unnecessary limitations should be understood therefrom as modifications will be obvious to those skilled in the art.

We claim:

1. The method of flameproofing cellulosic fibers which comprises impregnating the fibers with an emulsion containing (a) a dialkenyl beta, carboxyalkyl alkanephosphonate having the formula

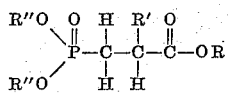

wherein R" is a member of the class consisting of allyl and methallyl radicals, R' is a member of the class consisting of hydrogen atoms and methyl radicals and R is a member of the class consisting of methyl and ethyl radicals, and (b) a dilute aqueous solution of polyvinyl alcohol containing not more than about 3.2% by weight, based on the weight of the reactants, of a polyvinyl alcohol, and heating the impregnated fibers at a polymerizing temperature and for a period of time sufficient to effect further polymerization and attachment of the resulting polymer to the fibers.

2. The method of preparing a flameproofing emulsion which comprises suspending a dialkenyl beta, carboxyalkyl alkanephosphonate having the formula

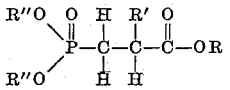

wherein R" is a member of the class consisting of allyl and methallyl radicals, R' is a member of the class consisting of hydrogen atoms and methyl radicals and R is a member of the class consisting of methyl and ethyl radicals in at least about an equal weight of an emulsifying polymerization medium containing a dilute aqueous solution of a polyvinyl alcohol, and heating the emulsion at a polymerizing temperature and for a period of time sufficient to effect substantial polymerization of the phosphonate.

3. The method of preparing a flameproofing emulsion which comprises suspending a dialkenyl beta, carboxyalkyl alkanephosphonate having the formula

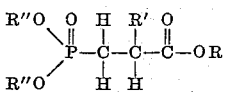

wherein R" is a member of the class consisting of allyl and methallyl radicals, R' is a member of the class consisting of hydrogen atoms and methyl radicals and R is a member of the class consisting of methyl and ethyl radicals in an emulsifying polymerization medium containing a dilute aqueous solution containing not more than about 3.2% by weight, based on the weight of the reactants, of a polyvinyl alcohol, and heating the emulsion at a polymerizing temperature and for a period of time sufficient to effect substantial polymerization of the phosphonate.

4. The method of preparing a flameproofing emulsion which comprises suspending a dialkenyl beta, carboxyalkyl alkanephosphonate having the formula

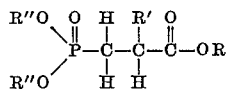

wherein R″ is a member of the class consisting of allyl and methallyl radicals, R′ is a member of the class consisting of hydrogen atoms and methyl radicals and R is a member of the class consisting of methyl and ethyl radicals in a dilute aqueous solution containing not more than about 3.2% by weight, based on the weight of the reactants, of a polyvinyl alcohol, adding about 2–5% by weight, based on the weight of the phosphonate of bromoform, adding a small amount of a polymerization catalyst and heating the emulsion at a polymerizing temperature and for a period of time sufficient to effect substantial polymerization of the phosphonate.

References Cited in the file of this patent

UNITED STATES PATENTS

| | | |
|---|---|---|
| 2,478,441 | Wiley | Aug. 9, 1949 |
| 2,559,854 | Dickey et al. | July 10, 1951 |
| 2,660,542 | Walter et al. | Nov. 24, 1953 |
| 2,660,543 | Walter et al. | Nov. 24, 1953 |
| 2,668,800 | Johnston | Feb. 9, 1954 |
| 2,681,920 | Van Winkle et al. | June 22, 1954 |
| 2,686,768 | Frick et al. | Aug. 17, 1954 |
| 2,714,100 | Fon Toy et al. | July 26, 1955 |
| 2,725,311 | Kenega et al. | Nov. 29, 1955 |
| 2,780,616 | Dickey et al. | Feb. 5, 1957 |
| 2,811,469 | Costello | Oct. 29, 1957 |

FOREIGN PATENTS

| | | |
|---|---|---|
| 660,169 | Great Britain | Oct. 31, 1951 |

OTHER REFERENCES

Chemical Abstracts, vol. 45, col. 8970, Oct. 25, 1951.